United States Patent
Hasegawa et al.

(10) Patent No.: US 9,671,979 B2
(45) Date of Patent: *Jun. 6, 2017

(54) DATA WRITING IN A FILE SYSTEM (71) Applicant: International Business Machines Corporation, Armonk, NY (US)

(72) Inventors: Tohru Hasegawa, Tokyo (JP); Hiroshi Itagaki, Yokohama (JP); Shinsuke Mitsuma, Tokyo (JP); Noriko Yamamoto, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,032

(22) Filed: Aug. 11, 2016

(65) Prior Publication Data

US 2017/0131950 A1 May 11, 2017

Related U.S. Application Data (63) Continuation of application No. 15/067,404, filed on Mar. 11, 2016, now Pat. No. 9,459,814, which is a continuation of application No. 14/935,515, filed on Nov. 9, 2015.

(51) Int. Cl.
G06F 3/06 (2006.01)
G11B 20/12 (2006.01)
G11B 5/008 (2006.01)
G06F 17/30 (2006.01)

(52) U.S. Cl.
CPC .......... *G06F 3/0682* (2013.01); *G06F 3/0613* (2013.01); *G06F 3/0643* (2013.01); *G06F 3/0659* (2013.01); *G06F 17/30182* (2013.01); *G11B 5/008* (2013.01); *G11B 20/1201* (2013.01)

(58) Field of Classification Search
None
See application file for complete search history.

(56) References Cited

U.S. PATENT DOCUMENTS

| 7,747,816 | B1 | 6/2010 | Nourmohamadian et al. |
| 7,870,172 | B1 | 1/2011 | Sarma |
| 8,639,894 | B2 | 1/2014 | Sharma |
| 8,688,905 | B2 | 4/2014 | Brume et al. |

(Continued)

OTHER PUBLICATIONS

"Real-Time Fragmentation Prevention with OptiWrite", Raxco Software, Defragmentation Technology; White Paper, Copyright 2011, 10 Pages.

(Continued)

*Primary Examiner* — Yaima Rigol
(74) *Attorney, Agent, or Firm* — Edward J. Wixted, III (57) ABSTRACT

In an approach for writing data on a tape using a file system, a processor receives a first write request of a first file. A processor obtains data of the first file. A processor writes the data of the first file on a tape. A processor receives a second write request of a second file prior to completion of writing the data of the first file on the tape. A processor adds information about the second file to a first list, wherein the first list includes files waiting to write. Subsequent to writing the data of the first file on the tape, a processor obtains data of the second file based on the first list. A processor writes the data of the second file after the first file on the tape.

1 Claim, 5 Drawing Sheets

(56) References Cited

U.S. PATENT DOCUMENTS

| | | |
|---|---|---|
| 8,806,143 B1 | 8/2014 | Cheng |
| 9,459,814 B1 | 10/2016 | Hasegawa et al. |
| 2004/0162939 A1 | 8/2004 | Bartlett |
| 2005/0041317 A1 | 2/2005 | Jaquette |
| 2005/0138091 A1 | 6/2005 | Bono |
| 2014/0043710 A1 | 2/2014 | Katagiri et al. |
| 2015/0062733 A1 | 3/2015 | Ashida et al. |
| 2015/0199132 A1 | 7/2015 | Fujihara et al. |

OTHER PUBLICATIONS

Appendix P: List of IBM Patents or Patent Applications Treated as Related, Dated Nov. 4, 2016, pp. 1-2.

U.S. Appl. No. 14/935,515, filed Nov. 9, 2015; Entitled "Data Writing in a File System".

Hasegawa et al.,"Data Writing in a File System", U.S. Appl. No. 15/415,092, filed Jan. 25, 2017, 17 pages.

IBM, List of IBM Patent Applications Treated as Related, Appendix P, dated Jan. 27, 2017, 2 pages.

U.S. Appl. No. 14/935,515, filed Nov. 9, 2015; Entitled "Data Writing in a File System".

Appendix P: List of IBM Patents or Publications Treated as Related, Filed Herewith, 2 pages.

DATA WRITING IN A FILE SYSTEM

BACKGROUND

The present invention relates to data writing in a file system, and more specifically, to a method of writing data in a file system which manages files using a tape drive.

A Linear Tape File System (LTFS) allows files stored on magnetic tape to be accessed in a similar fashion to those on disk or removable flash drives. LTFS requires bire a specific format of data on the tape media and software to provide a file system interface to the data.

SUMMARY

Aspects of an embodiment of the present invention disclose a method, computer program product, and computing system for writing data on a tape using a file system. A processor receives a first write request of a first file. A processor obtains data of the first file. A processor writes the data of the first file on a tape. A processor receives a second write request of a second file prior to completion of writing the data of the first file on the tape. A processor adds information about the second file to a first list, wherein the first list includes files waiting to write. Subsequent to writing the data of the first file on the tape, a processor obtains data of the second file based on the first list. A processor writes the data of the second file after the first file on the tape.

DETAILED DESCRIPTION

Linear Tape File System (LTFS) is a technique allowing data to be recorded in and read out from a tape loaded in a tape drive through a file system. LTFS allows a user to use the tape as large-capacity external recording media through similar operation performed on removable hard disks. Embodiments of the present invention recognize that the tape requires more time in the order of seconds than the disk to detect a head of data (seek time/access time), which may largely degrade performance depending on how a user uses the tape/tape drive.

Figure 1:
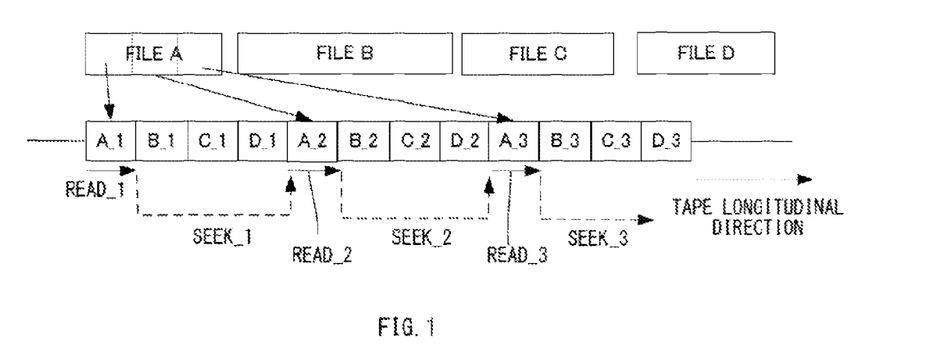
FIG. 1 is a diagram showing a configuration example of a conventional method of writing data on a tape using a file system.

Particularly, when a plurality of files are simultaneously written in a tape using LTFS, because the files are written on the tape in a mixed manner as shown in FIG. 1, data is fragmented. When one file (for example File A) read out from these files in this state, seek time (seek_1, seek_2, seek_3 . . . ) for seeking the subsequent data position occurs as shown in FIG. 1, which has a large influence on performance.

Figure 2:
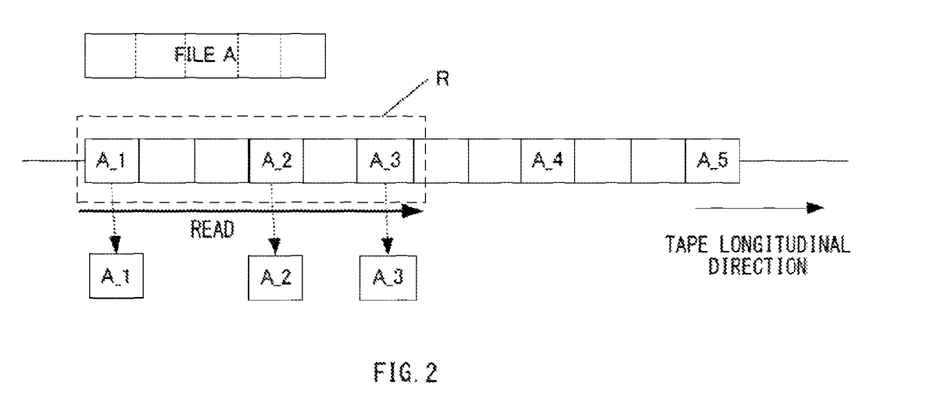
FIG. 2 is a diagram showing a configuration example of a conventional method of reading data on a tape using a file system.

Embodiments of the present invention recognize that one of the possible solutions to this problem is an approach in which files are purposely written in a mixed manner while a data size written at one time is made small in order to eliminate seek time. When, for example, a file A is read out from the data written in this manner, as shown in FIG. 2, a start position of the subsequent data always exists in a buffer within the tape drive. Therefore, seek time for seeking of the head in the drive does not occur, and the head moves to the starting position of the subsequent data far more quickly than in a case where the head moves by making a tape travel.

By repeating this, a loss due to the seek time by travel of the tape is eliminated. However, in this case, excess data is read out when file A is read out, for example all data in region R corresponding to a buffer size in FIG. 2 is read out. Because the excess data is discarded if the data is unnecessary, the data transferring speed of file A itself ($A\_1$, $A\_2$, $A\_3$ . . . ) is expected to be only a certain percentage of a transferring speed that the tape drive originally has.

Embodiments of the present invention recognize that it is necessary to minimize tape travelling seek time in order to improve performance upon readout of data, and it is necessary to perform writing so as to maximize the transferring speed of the tape drive when a necessary file is loaded.

Figure 3:
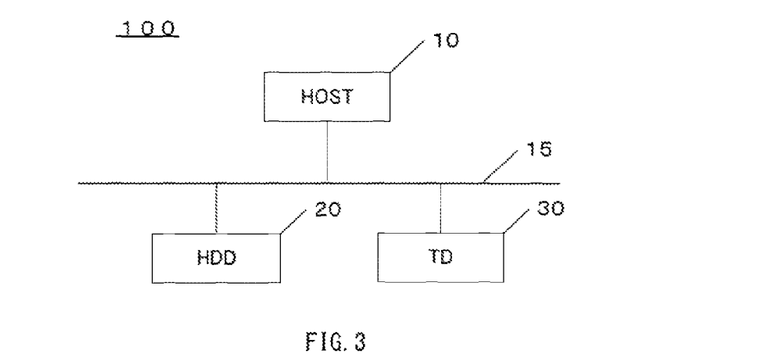
FIG. 3 is a diagram showing a configuration example of a storage system which performs a file system of one embodiment of the present invention.

The following is an explanation of an embodiment of the present invention with reference to the drawings. FIG. 3 is a diagram showing a configuration example of a system/storage system which performs a file system of one embodiment of the present invention. Storage system 100 includes a host 10, a hard disk drive (HDD) 20, and a tape drive (TD) 30 which can communicate through a network 15.

Host 10 can include computers, such as a server or a personal computer (PC). HDD 20 may be a type of HDD built in host 10. Moreover, other storage devices such as a semiconductor memory (SSD etc.) can be used instead of HDD 20. TD 30 can include a single type or a set type TD like a tape library. Storage system 100 can include HSM (hierarchical storage management) system. Especially, the system may be like RAID1 whose one of HDDs is replaced with TD 30.

Host 10 mounts/executes a file system used in embodiments of the present invention. The file system can include LTFS, for example. LTFS can carry out direct access to the files stored in the tape cartridge like HDD, a USB memory, or other removable recording medium such as CD-R, if the tape cartridge is inserted in TD. The following explains the example using LTFS as a file system. It should be noted that other file systems can be used to perform embodiments of the present invention.

According to the method/system of the present invention, the file system (LTFS) operates to let the tape drive 30 sequentially write files to the tape one by one based on the following logic when a plurality of files are simultaneously written. The logic is as follows: (a) when writing of a given file is started and writing requests of other files are received, writing of the other files into a tape is put into a standby (e.g., waiting) state while starting positions of the other files are ready until the writing of the given file is finished; and (b) writing of the files put into a standby (e.g., waiting) state is started in the order they are put into a standby (e.g., waiting) state after writing of the given file being written is finished.

The above logic allows embodiments of the present invention to minimize occurrence of a case where different files are written in a mixed manner and prevents degradation of performance upon readout.

Figure 4:
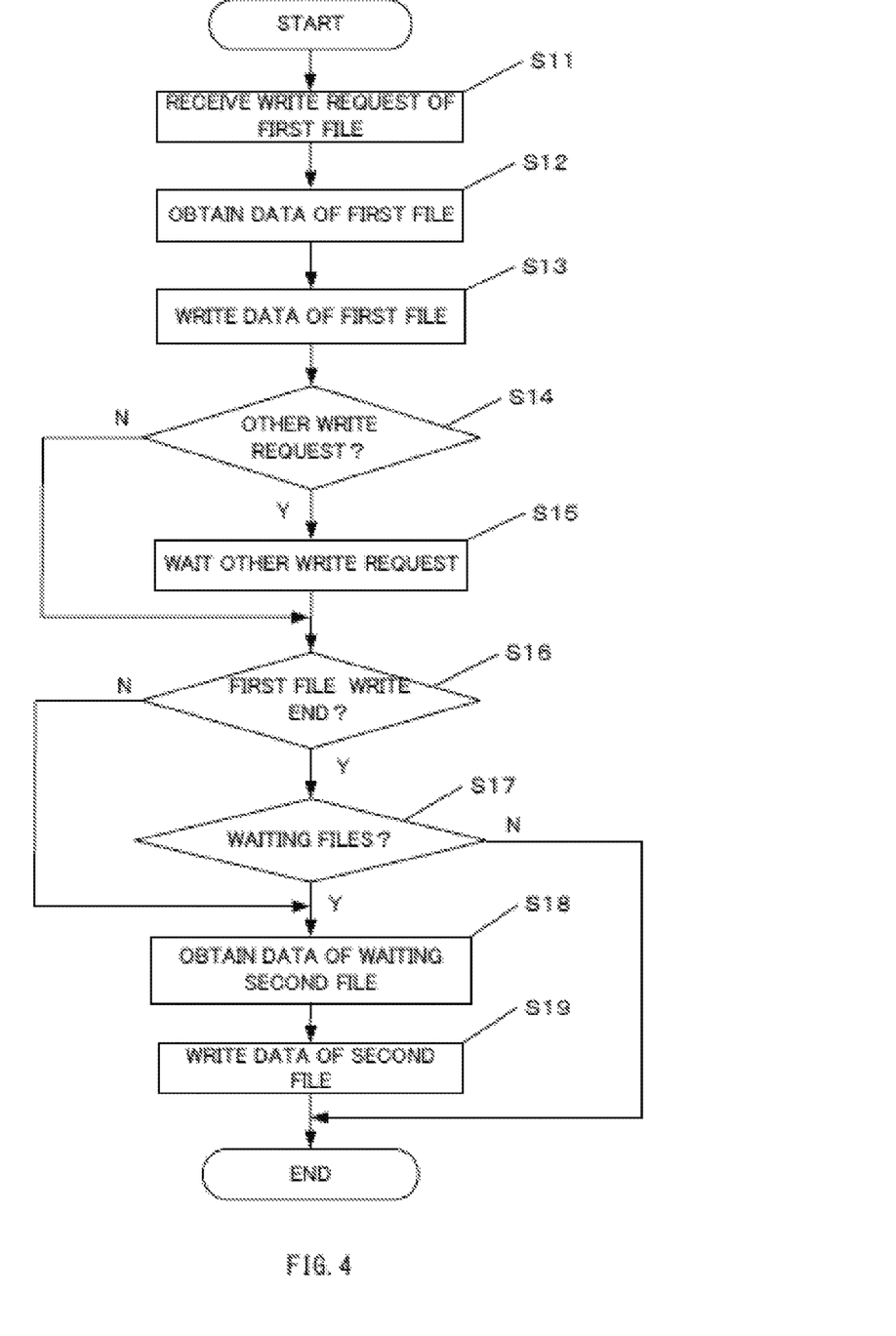
FIG. 4 is a flowchart depicting a method of one embodiment of the present invention.

FIG. 4 is a flowchart depicting an approach according to one embodiment of the present invention. FIG. 4 shows an example of a flowchart reflecting the above-mentioned logic (a) and (b). The flow of FIG. 4 is performed by, for example, LTFS in storage system 100 of FIG. 3. The execution of the flowchart may be performed using the predetermined software which can be used and hardware in the storage system 100 of FIG. 3. The software which has program instructions can be embodied in a computer program product comprising a computer readable storage medium. The program instructions can be executed by a computer such as the host 10, shown in FIG. 3, after the program instructions have been read out from the computer readable storage medium.

In step S11 of FIG. 4, LTFS receives a write request of a first file (for example, file A) as a system call. In step S12, LTFS obtains data of the first file which has been received the write request. LTFS sends the data of the first file to tape drive 30. Tape drive 30 temporarily stores the data of the first file in the built-in buffer (memory). In step S13, the tape drive 30 writes the data of the first file on a wrap (for example, wrap 0) of the tape built in the tape drive.

In step S14 of FIG. 4, LTFS confirms whether to have received write request of other files. If LTFS received the write request of the other files before the end of the writing of the first file (decision S14, yes branch), in next step S15, LTFS keeps the write request waiting. Specifically, when LTFS receives a system call for write, processing is put into a standby (e.g., waiting) state by not transmitting write data of the file to the tape drive 30 until actual write conditions are met in the write processing. If a given time-out value is set for the write processing at the application side, it is necessary to change the time-out value appropriately. LTFS adds information of the other files at the end of a write waiting file list further. The information of the other files includes a file name, file/data size, element number of a file, for example. The write waiting file list includes the information of a plurality of waiting files to be written.

In step S16, it is judged whether the data of the first file was written or not. If the first file was written, (decision S16, yes branch), in next step S17, it is determined whether other waiting files exist in the write waiting file list or not. If it is determined that the other waiting files exist in the write waiting file (decision S17, yes branch), in the next step S18, LTFS obtains data of a waiting second file (for example, file B) which is the top of the list. LTFS further sends the data of the second file to tape drive 30. Tape drive 30 temporarily stores the data of the second file in the buffer (memory) like the case of step S12. In step S19, tape drive 30 writes the data of the second file on a wrap (for example, wrap 0) of the tape. In addition, if all data of the second file has been written in the wrap, the information of the second file in the write waiting file list is deleted.

FIG. 4 explains the write of two files, a first file and a second file. That is, the first file is written first, and then the second file is written as a last file. However, the present invention is not limited to the write of the two files only. Three or more files (File C, File D, File E, File F . . . ) may be written in continuously. Each step of FIG. 4 may be similarly performed for other files. For example, in step S16, a third file, which is the next file, may go to END because the third file write finished, and the next file, a fourth file, may wait in step S17 and be written in step S19.

Figure 5:
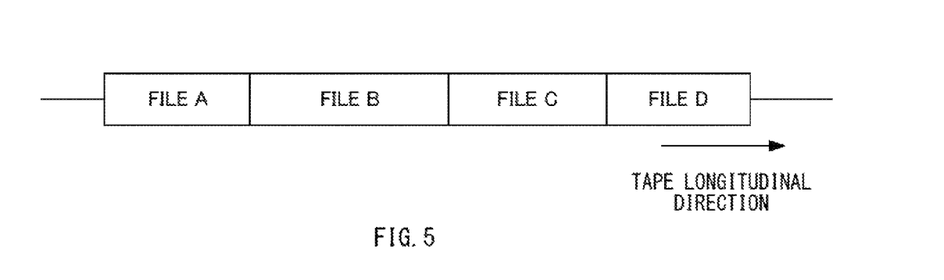
FIG. 5 is a diagram showing a configuration example of tape image in which files were written by a method of one embodiment of the present invention.

FIG. 5 is a diagram showing a configuration example of tape image in which files were written by the processing flow of FIG. 4. In FIG. 5, data of four files A, B, C, and D are continuously written on the tape (for example, wrap 0). Since each file can be read out at once continuously, it is possible to maximize the performance of tape drive 30 when respective files are read out.

Further, there is a case where an approach in which writing of other files is put into a standby (waiting) state until writing of one file is finished is not efficient depending on the size of files to be written and use conditions by the user. In such a case, the following logic (A)-(D) is proposed further. (A) When writing of a given file is started, writing is continued until the following conditions are met. A1: when writing has been performed until data reaches a certain size. A2: when writing has been performed up to a designated longitudinal position (LPOS) position. A3: when writing of the file has been completed before data reaches a certain size or a designated LPOS. A LPOS is a unit indicating a position in the longitudinal direction of the tape (e.g., of TD 30) for which the head performs reading. (B) Writing of the files put into a standby (waiting) state is started in the order they are put into a standby (waiting) state after writing of the file being written is finished or interrupted by the conditions described in above (A). (C) Writing of the file which has been interrupted is restarted when the following conditions are met. C1: when the head position of the tape drive reaches the vicinity of the LPOS at the time when writing is finished. C2: when there is no other file to be written. C3: when a write position enters a restarting LPOS range of a preferential interrupted file (forcibly interrupted). The restarting LPOS range means a range for which it is assumed that, when wrap movement occurs upon readout of data, the subsequent data can be read out efficiently in view of movement of the head of the drive in association with the wrap movement. (D) Application of dummy data mode. When quick readout is desired even at the expense of the capacity of the tape, a dummy data mode is employed. In this mode, writing of dummy data is continued until the subsequent writing position of the file for which writing is interrupted reaches the vicinity of the LPOS.

Figure 6:
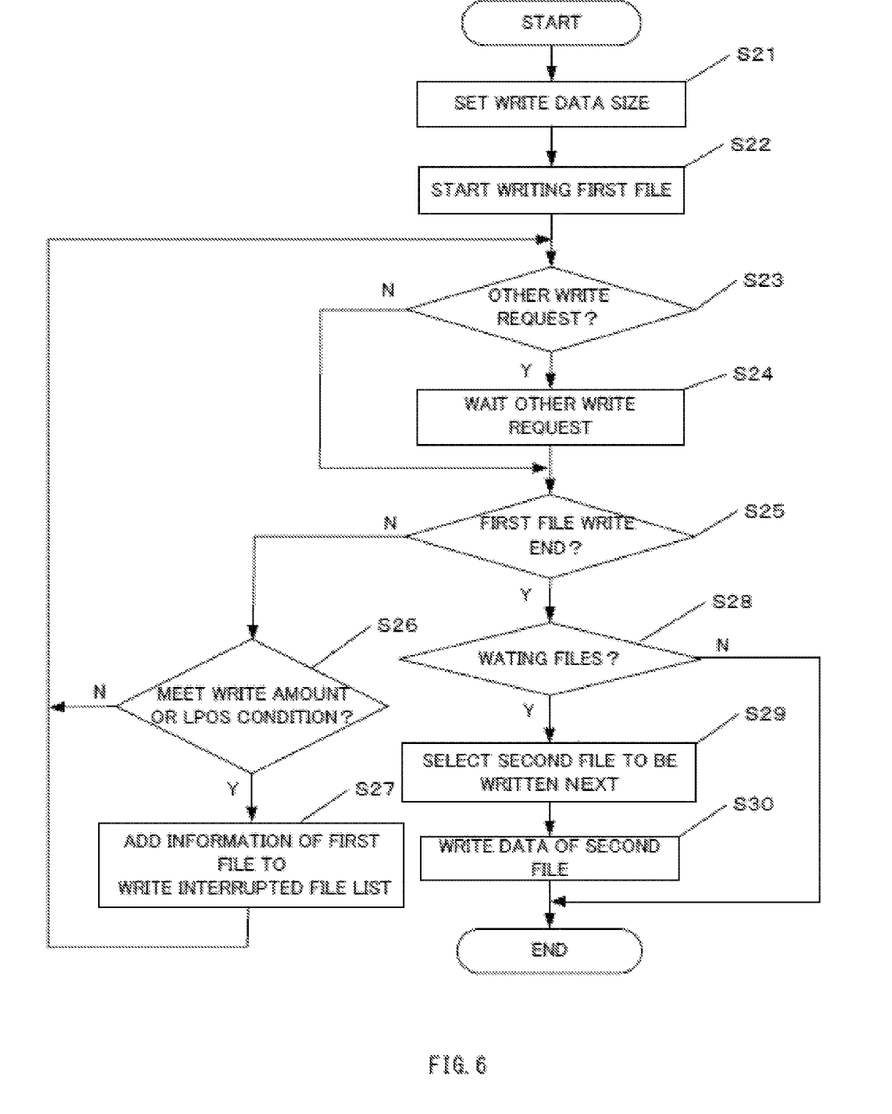
FIG. 6 is a flowchart depicting a method of one embodiment of the present invention.

FIG. 6 is a flowchart showing an approach of one embodiment of the present invention. FIG. 6 shows an example of the above-mentioned additional logic (A)-(D). The flow of FIG. 6 is performed by, for example, LTFS in storage system 100 of FIG. 3. In step S21 of FIG. 6, write data size is set. A predetermined length such as 1 wrap, (½) wrap, or (¼) wrap of a tape is defined as the size of data written at one time, for example. In step S22, LTFS starts writing a first file which has been received a write request on the tape. Specifically, first the same steps as steps S11 and S13 of FIG. 4 are performed, and next tape drive 30 starts writing the data of the predetermined length (for example, wrap (¼)) of the first file on a wrap (for example, wrap 0) of the tape built in the tape drive.

In step S23 of FIG. 6, LTFS confirms whether to have received write request of other files. If LTFS received the write request of the other files before the end of the writing of the data of the file A, in next step S24, LTFS keeps the write request waiting. LTFS adds information of the other files at the end of a write waiting file list further. The steps S23 and S24 are substantially similar to the steps S14 and S15 of FIG. 4. In step S25, it is determined whether all the data of the first file was written or not. If it is determined that all of the data of the first file was not written, (decision S25, no branch), the next step S26 is executed.

In step S26, it is determined whether the write amount of the data of the first file exceeds the write data size (for example, (¼) wrap) defined in step S21, or meets LPOS condition. The LPOS condition includes that the writing of the data has been performed up to a designated LPOS position. The designated LPOS position includes a LPOS position when writing finished before, for example, the above mentioned restarting LPOS range of a preferential interrupted file. If it is determined that the write amount of the data of the first file does exceed the write data size or meet LPOS condition (decision S26, yes branch), in next step S27, LTFS first obtains information of write position including LPOS position and wrap at the time of the write interruption for the first file. Next, LTFS adds/writes the information of write position for the first file in a write interrupted file list. The write interrupted file list includes the information of write position for a plurality of interrupted files to be rewritten later. If it is determined that the write amount of data of the first file does not exceed or does not meet LPOS condition (decision S26, no branch), the process goes back to step S23.

If it is determined that the first file write has ended (decision S25, yes branch), in step S28, it is determined whether there are files should be written/rewritten in the write waiting file list and the write interrupted file list. If the determination of step S28 is that there are files (decision S28, yes branch), in the next step S29, LTFS selects a second file (for example, file B) to be written/rewritten next from the write waiting file list and the write interrupted file list. In step S30, the tape drive 30 writes the data of the second file on a wrap (for example, wrap 0) of the tape. In addition, if all the data of the second file has been written in the wrap, the information of the second file in the write waiting file list and/or the write interrupted file list is deleted.

In addition, in FIG. 6, the present invention is not limited to the write of the two files only, as explained above with reference to FIG. 4 (step S16-S19). That is, there is the case where three or more files (e.g., File C, File D, File E, File F . . . ) are written in continuously. Each step of FIG. 6 is similarly performed for other files. For example, in step S25, the file C which is the next file may go to END because the file C write finished, and the next File D may wait in step S28 and be written in step S30.

The selection of the second file B in step S29 is performed, for example, as follows: (a) when writing is forcibly interrupted by the above described (C)-C3, the caused file for the interruption is selected; (b) when the number of files put into a standby state exceeds a predetermined threshold, the first file is selected among the files in the write waiting file list; (c) when there is no file having a priority flag in the write interrupted file list, the first file is selected among the files in the interrupted file list; (d) when there are files having priority flags in the interrupted file list, a file for which writing can be started from a position closest to the restarting LPOS range is selected among them; (e) when there is no file in the write waiting file list, files are selected from the write interrupted file list in order of the following conditions; E1: a file for which writing can be started within the restarting LPOS range is selected among files having priority flags. If there is a plurality of such files, a file with a smaller element number is selected; E2: a file for which writing can be started within the restarting LPOS range is selected among files not having a priority flag. If there is a plurality of such files, a file with a smaller element number is selected; and E3: a file for which writing can be started at the position closest to the restarting LPOS range is selected.

Figure 7:
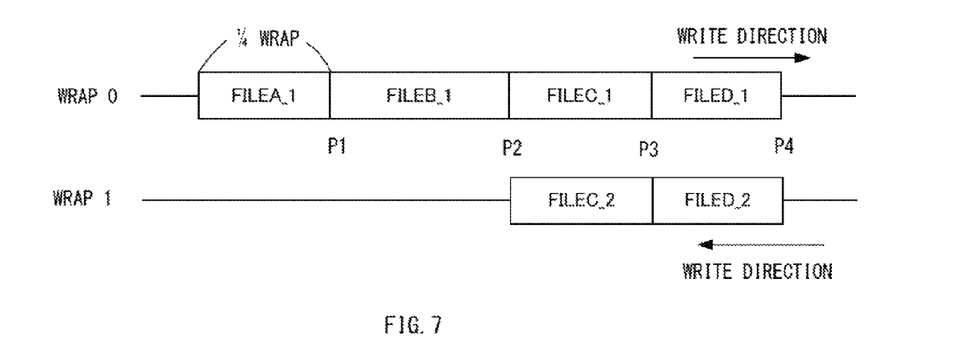
FIG. 7 is a diagram showing a configuration example of tape image in which files were written by a method of one embodiment of the present invention.

FIG. 7 is a diagram showing a configuration example of tape image in which files were written by an approach of one embodiment of the present invention, for example, an embodiment shown in FIG. 6. The writing of files in FIG. 7 may be performed as follows. (a) ¼ wrap is set as the size of data written at one time, and writing of File A having a size of approximately 1 wrap is interrupted once at a point of P1. ¼ wrap of File A (FILEA_1) was written by the point of P1. File A is added to the write interrupted file list together with point P1 (LPOS/Wrap). (b) In a similar manner, when File B, File C and File D each having a size of approximately 1 wrap, are put into a standby state in this order, ¼ wrap of File B (FILEB_1) which has been put into a standby state first is written, and File B is added to the write interrupted file list. (c) After ¼ wrap of File D (FILED_1) is written, if there is any other file put into a standby state, the file is written. If there is no other file, writing of files which are selected, from the files for which writing is interrupted, in the order of proximity of the points at the time of interruption, is restarted. In this case, because point P4 of File D is the closest, writing of File D (FILED_2) is continued. (d) In a similar manner, writing of File C (FILEC_2) is sequentially restarted from the point of P3.

Figure 8:
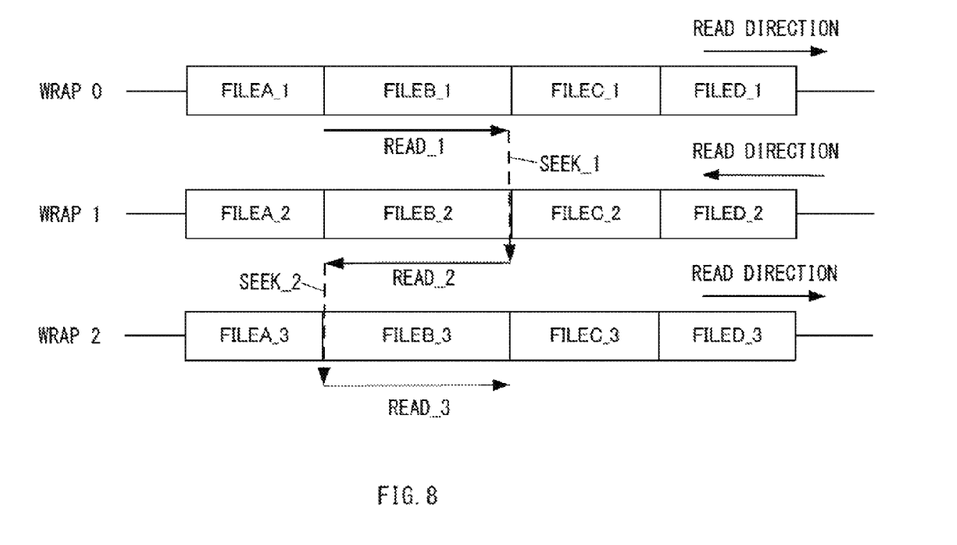
FIG. 8 is a diagram showing a configuration example of reading from the tape image in which files were written by a method of one embodiment of the present invention.

FIG. 8 is a diagram showing a configuration example of reading from the tape image in which files were written by the writing process shown in FIG. 7. When file B read out in FIG. 8, file B which includes FILEB_1, FILEB_2, and FILEB_3 are read out by performing "READ_1", "READ_2", and "READ_3" continuously as shown in FIG. 8. For example, in the case of a tape of LTO6, the length (direction indicated by the LPOS) extends over 800 m while a width (direction wrap movement occurs) is over 1 cm. Because it takes approximately one minute for the head to move from an end to the center of the tape, while time required for wrap movement is approximately 1 to 3 seconds, if the files are written while each of the files is divided into four parts as illustrated in FIG. 8, and if the head can move to the subsequent data only by wrap movement, performance of readout is more favorable than a case where each of the files is divided into two parts and data is separated by half of the wrap.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

What is claimed is:

1. A computer program product for writing data on a tape using a file system, the computer program product comprising:
    one or more computer readable storage media and program instructions stored on the one or more computer readable storage media, the program instructions comprising:
    program instructions to receive a first write request of a first file;
    program instructions to obtain data of the first file;
    program instructions to write the data of the first file on a tape, wherein program instructions to write the data of the first file on the tape comprise:
        program instructions to write a first portion of the data of the first file in a first wrap of the tape, wherein the first portion of the data of the first file is of a first predetermined length; and
        program instructions to write information on a write position of the first portion of the data of the first file in a second list, wherein the second list includes information about write interrupts;

program instructions to receive a second write request of a second file prior to completion of writing the data of the first file on the tape;

program instructions to add information about the second file to a first list, wherein the first list includes files waiting to write;

subsequent to writing the data of the first file on the tape, program instructions to obtain data of the second file based on the first list;

program instructions to write the data of the second file after the first file on the tape, wherein program instructions to write the data of the second file after the first file on the tape comprise:

program instructions to write a first portion of the data of the second file after the first portion of the data of the first file in the first wrap of the tape, wherein the first portion of the data of the second file is of a second predetermined length; and program instructions to write information on a write position of the first portion of the data of the second file in the second list;

program instructions to write a second portion of the data of the second file in a second wrap of the tape, wherein the second portion of the data of the second file is of a third predetermined length, based on the information on the write position of the first portion of the data of the second file in the second list;

program instructions to write a second portion of the data of the first file in a second wrap of the tape, wherein the second portion of the data of the first file is of a fourth predetermined length, based on the information on the write position of the first portion of the data of the first file in the second list;

program instructions to receive a third write request of a third file prior to completion of writing the data of the first file on the tape;

program instructions to add information about the third file to the first list, such that the information about the third file is of a lower priority than the information about the second file on the first list; and subsequent to writing the second portion of data of the first file in the second wrap of the tape, program instructions to delete the information on the write position of the first portion of the data of the first file from the second list.

\* \* \* \* \*